United States Patent Office 3,232,856

Patented Feb. 1, 1966

3,232,856

FABRICATION OF A MINIATURE CAPACITOR

Stanley J. Klach, Riverdale, and Robert A. Keeler, Newark, N.J., assignors to Vitro Corporation of America, New York, N.Y., a corporation of Delaware No Drawing. Filed July 17, 1961, Ser. No. 124,351
11 Claims. (Cl. 204—181)

This invention relates to miniature capacitors and to a method of making them, and especially to such devices having an adequately high capacitance.

The production of small or "miniature" capacitors of high capacity has lagged behind the development of other small components of electrical circuits such as transistors. One of the main reasons for this is believed to be the difficulty of producing uniform thin multiple layers of metal and dielectric material.

The capacitance of a condenser is directly proportional to the surface area and dielectric constant and inversely proportional to the distance between the electrodes or plates. The following formula expresses the relationship between the pertinent variables.

$$C=\frac{0.0885kA}{t}(n-1)$$

where C is capacitance in micro-microfarads ($\mu\mu$f.), $k$ is the dielectric constant, A is the area of metal electrode in square centimeters, $n$ is the number of metal electrodes or plates, and $t$ is the thickness of the dielectric layer in centimeters. For example, to obtain a miniaturized capacitor having a capacitance of 2000 $\mu\mu$f., assuming, for purpose of formulation, miniaturization consisting of a dielectric thickness of 0.5 mil on an area of a 0.25 cm.$^2$, it would be necessary to deposit a material having a dielectric constant of 115.

Although the ferroelectric titanates, niobates, zirconates and tantalates have dielectric constants of this order of magnitude, these materials have very high temperature coefficients and loss factors when used alone.

Generally speaking, the addition of metal oxides to a ferroelectric decreases the loss factor, dielectric constant and temperature coefficient (TCK) of the pure material. The thermal characteristics and loss factors (the ratio of resistance to capacitive reactance) of the ferroelectric materials can therefore be controlled by the addition of foreign oxides including the metal oxides. However, the addition of such materials decreases the dielectric constant.

This is illustrated in the following table, which shows compositions to which increasing amounts of MgO, and of $Bi_2(SnO_3)_3$ are added and the effects on dielectric constant ($k$), loss factor and temperature coefficient.

TABLE I.—DIELECTRIC PROPERTIES OF Mg-$SrTiO_3$ AND $BaTiO_3$-$Bi_2(SnO_3)_3$

| Mol percent | | | $k$, 25° C. | (Loss factor ×10[4]) 25° C. | Average TCK (−40° to 200° C.) (p.p.m./° C.) |
|---|---|---|---|---|---|
| MgO | SrO | $TiO_2$ | | | |
| 0 | 24.5 | 75.5 | 147 | 2.5 | −2,300 |
| 12.6 | 12.1 | 75.2 | 42 | 1.4 | −750 |
| 31.1 | 2.4 | 66.5 | 19 | 1.0 | +30 |
| Mol Percent $BaTiO_3$ | Mol Percent $Bi_2(SnO_3)_3$ | | | | |
| 96.7 | 3.3 | | 1,265 | 256 | −600 |
| 96.4 | 3.6 | | 1,195 | 254 | +100 |
| 96 | 4.0 | | 1,050 | 272 | −500 |
| 95 | 5.0 | | 870 | 301 | −900 |
| 70 | 30 | | 198 | 309 | 0 |
| 50 | 50 | | 80 | 225 | 0 |

By decreasing the thickness of the dielectric layer ($t$ in the formula given above), the desired capacitance could be obtained. However, the deposition of thin, uniform layers, particularly layers of uniform mixtures of materials, presents a serious problem.

Some materials such as silica are desirable from the standpoint of having a low temperature coefficient of capacitance, and/or a low loss factor, but have a very low dielectric constant. From the formula it is seen that the low constant may be compensated for by making thinner films or increasing the number of plates. For example, a parallel plate capacitor having a capacitance of about 2000 $\mu\mu$f., again assuming a plate area of 0.25 cm.$^2$, could be prepared using silica, which has an extremely low dielectric constant of 4, if 0.08 mil thick films of silica could be deposited on six parallel plates. However, it has not been feasible, using known procedures, to make capacitors having such thin films.

Because of the particular problems involved in manufacturing thin film miniature capacitors having a wide range of capacitance and having controllable temperature coefficients and loss factors, any coating technique adapted to fabricate such capacitors must meet several criteria. The technique must be capable of depositing films of inorganic or ceramic materials of less than 1.0 mil thickness. In addition, the technique must exhibit good control over the thickness of the film and the area to which it is applied. The particular method employed for manufacturing miniature capacitors should be capable of forming parallel plate or multi-layered articles. Finally, the film-forming method must also have the ability to deposit mixtures of two or more components in thin films and in controlled concentrations.

This last named requirement is important where the need arises for a capacitor having particular characteristics such as a high dielectric constant coupled with a low temperature coefficient. Moreover, there are many situations where a single dielectric could not be utilized due to a high temperature coefficient and loss factor. In such situations, only mixed dielectrics would be suitable.

Techniques which have been previously utilized in the coating art for the deposition of thin films cannot be advantageously employed in the fabrication of miniature capacitors. Vapor deposition and chemical plating procedures have been strictly limited to the deposition of metallic films. Films prepared by anodic oxidation have high dielectric losses and are difficult to reproduce because of uncontrollable variations in porosity. A further disadvantage to the anodic oxidation technique is the impossibility of depositing films from mixtures of more than one material.

The doctor blade technique is somewhat limited in its application to the deposition of thick coatings. A film thickness of 1 mil or less is beyond the capabilities of this procedure.

Spray methods and vacuum evaporation have been applied to the deposition of a wide variety of materials. However, the utilization of these techniques in the miniaturization of capacitors has been avoided because of the many problems involved in controlling film area and thickness, in avoiding pin-hole formation, and in the attempted deposition of multiple layers.

It is an object of the present invention to prepare miniature capacitors utilizing a coating method which is capable of depositing films of inorganic or ceramic materials of less than 1.0 mil thickness, which exhibits good control over the thickness of the film and the area to which it is applied, which is capable of forming multilayered articles, and which has the ability to deposit mixtures of two or more components in thin films and in controlled concentration.

It is also an object of this invention to manufacture miniature thin film capacitors having a wide range of capacitance and controllable temperature coefficients and loss factors.

Another object of the invention is to fabricate miniature capacitors having dielectric films of less than 1.0 mil thickness.

The foregoing and other objects and advantages of the invention are realized by utilizing electrophoretic deposition to fabricate capacitors having at least 20 $\mu\mu$f. capacitance, the layer of dielectric material being not more than 1.0 mil thick and the plate area (A) not greater than 5 square centimeters. Preferably, the thickness of the dielectric layer is not greater than 0.5 mil. The number of parallel plates or electrodes may suitably be from 2 to 6 or even more.

The electrophoretic deposition procedure is described in a publication entitled, "Electrophoretic Deposition of Metallic and Composite Coatings," by Shyne et al. in Plating, October 1955, pp. 1255–1258. In the electrophoretic coating process, a suspension is prepared of the material to be deposited in a suitable liquid vehicle, preferably an organic liquid. The suspension may be prepared by ball-milling the coating material in a liquid vehicle, for example alcohol, to obtain a finely dispersed material. The electrical charge of a particle is acquired during the dispersing operation because of absorption from ionizable substances or a reaction between the solids and liquids. The organic liquids used as suspending vehicles prevent electrolytic reaction and gassing of the electrodes. The article to be coated is made one of the electrodes in a bath of the suspension. The suspension is preferably agitated slowly during deposition to prevent settling. Cell voltages of 200 to 1000 volts D.C. are permissible because the vehicle is a relatively anhydrous nonconductive liquid. The surface of the substrate may be cleaned before it is immersed in the plating bath. Coating thicknesses can be varied with the deposition time, electrode spacing, voltage and suspension concentration.

The resulting coating is dried and subjected to a densification treatment. Mechanical working techniques such as rolling, ball burnishing and spinning may be used for densification of the coating. However, it is preferred particularly for complex shapes, to bring about densification of the coatings by employing fluid pressure designated, "Isostatic Pressing." One such method is disclosed in United States Patent No. 2,913,385.

In still another method employing hydrostatic pressure, the coated body is placed in a soft rubber or plastic sleeve which is then evacuated and tied off at both ends. This sleeve is then placed in a liquid in a hydrostatic pressure chamber and pressures of about 15 tons per square inch to about 50 tons per square inch are applied for a time sufficient to achieve maximum densification of the coating particles. The pressure is released and the coated body is removed from the rubber or plastic sleeve. This method is described in more detail in United States Patent No. 2,878,140.

In fabricating a miniature capacitor according to the present method, a layer of dielectric material is electrophoretically deposited on a conductive surface. The latter may be, for example, a palladium or molybdenum panel or a base which has been rendered conductive by application of a coating thereto. It should be noted that for structural or other reasons a conductive substrate may first be placed on a ceramic body by means such as painting, silk screening, etc.

The electrophoretically deposited dielectric film is densified and the next layer of conductor is applied by painting, electrophoretic deposition, etc., and also densified, if desired. Successive layers of dielectric and conductor can be applied to prepare a multi-layered capacitor.

A serious limitation on most coating techniques is the requirement of depositing a mixture of dielectric materials in controlled concentrations. Such mixtures are desirable for making some capacitors as pointed out above. By using electrophoresis, mixtures can be readily deposited in controlled concentrations, thereby offering a great advantage over other methods. The film thickness can be more easily controlled by electrophoresis and this is a very important requirement. Furthermore, a miniature, multilayered device can be readily fabricated through electrophoretic deposition.

The minimum film thickness of the dielectric ultimately depends upon the particle size of the dielectric materials being deposited. For example, silica and barium titanate are commercially available in particle sizes of about 0.02 and about 0.15 micron, respectively. By controlling the deposition to obtain a film 100 particles thick, the film thickness for silica and barium titanate will be 0.08 mil and 0.6 mil, respectively. Generally speaking, the particle size of the dielectric in suspension will range from about 0.005 micron to about 4 microns in diameter in order to obtain coatings not more than 1 mil thickness, as desired.

The following examples are used to illustrate the formation of thin films of different dielectric materials on various metallic electrodes. We do not intend to limit the invention to any particular procedure or product and hence the following examples are merely intended to be illustrations of a particular method by which the invention may be carried out.

*Example 1*

One side of an aluminum oxide wafer (5⁄16" x 5⁄16" x 0.010") was rendered conductive by painting a thin layer of palladium metal on the surface and isostatically densifying at 50 tons/in.$^2$ (t.s.i.). The palladium-coated wafer was then immersed in a dispersion containing 20 gms. $BaTiO_3$ (−325 mesh), 250 ml. of nitromethane, 100 ml. of isopropanol, and a weight of zein equivalent to 1% of the total weight of solids. Electrodes were attached to the steel beaker and to the palladium-coated wafer permitting the latter to serve as the cathode. While the dispersion was agitated, 250 volts D.C. were applied across the electrodes for 15 seconds consuming 10 milliamperes of current. The resulting coating having an area of 0.4 cm.$^2$ was then dried and densified isostatically at 50 t.s.i. An outer conductive palladium coating was subsequently applied to the $BaTiO_3$ coating by painting and the resulting tri-coat was again isostatically densified at 50 t.s.i. The densified coated wafer was finally sintered at 1175° C. for 1 hour in an atmosphere of air. This procedure resulted in the fabrication of a miniature capacitor having a dielectric layer thickness of about (not exceeding) 1 mil and a capacitance of 65 $\mu\mu$f. and controllable loss factor and temperature coefficient.

*Example 2*

A thin film of $SiO_2$ was electrophoretically deposited as described in Example 1 on one side of a platinum panel (¾" x ¾" x 0.010") from a dispersion containing 3 gms. of $SiO_2$ (particle size of 20 m$\mu$), 400 ml. of isopropanol, 50 ml. of nitromethane and 25 mgs. of zein. The densified, as-deposited coating measuring 3.6 cm.$^2$ in area was fired in air for 1 hour at 1400° C. and resulted in a 0.08 mil thick, adherent, glassy, dielectric film.

*Example 3*

A molybdenum panel (1½" x ½" x 0.015") was electrophoretically coated on one side as described in Example 1 with a boro-silicate glass from a dispersion containing 25 gms. of a preoxidized silicon-boron (66.3%–33.7%) mixture, 383 ml. of isopropanol, 177 ml. of nitromethane and 3% zein based on the solids content. The as-deposited coated panel was then dried and fired in argon at 1400° C. for 1 hour. The resultant film having an area of 5.0 cm.$^2$ and 1 mil thick was well sintered, adherent, and impervious.

*Example 4*

A $BaTiO_3$ film was electrophoretically deposited as described in Example 1 on one side of a platinum panel (½" x ½" x 0.010") from a dispersion containing 2 gm. of $BaTiO_3$ (ave. particle size of 0.5μ), 230 ml. of isopropanol, 110 ml. of nitromethane, 20 mg. of zein and a trace quantity of $Co(NO_3)_2 \cdot 6H_2O$. The as-deposited film was densified at 20 t.s.i. and fired in oxygen for one hour at 1400° C. The resultant film was well sintered and adherent, had an area of 1.61 cm.$^2$, and was 0.1 mil thick. A conductive silver coating was subsequently applied to the $BaTiO_3$ film by painting. This procedure yielded a miniature capacitor having a capacity of 240,000 μμf.

The process of this invention is capable of forming films of any inorganic or ceramic dielectric material on any conductive substrate whose melting point is in excess of the temperature required to sinter the film. Other well-known dielectric materials which are capable of being applied as a film may be utilized including oxides such as alumina, zirconates, niobates, titanates and mixtures of the foregoing materials. The materials tested in Table I may be applied as dielectric coatings in accordance with the present invention in spite of the low dielectric constant of many of them, because of the fact that extremely thin films of uniform thickness are made available. By a suitable selection of components of the dielectric material, the thickness of the dielectric layer, the number of layers and the area of each, a capacitor of almost any given characteristic is obtainable.

It will occur to those skilled in the art that there are many modifications to the invention as specifically described herein. It is intended to include all such modifications within the scope of the appended claims.

We claim:

1. In the manufacture of a miniature capacitor, the improvement comprising the steps of (1) coating one side of an aluminum oxide wafer with a thin layer of palladium metal, (2) electrophoretically coating said wafer with a layer of barium titanate not more than 1 mil thick, (3) applying an outer conductive palladium coating to the wafer and (4) subsequently densifying the resultant coated wafer, and heating the densified wafer to a temperature sufficient to sinter it, the thickness of the finished dielectric layer being not greater than 1 mil.

2. In the manufacture of a miniature capacitor, the improvement comprising the steps of (1) electrophoretically coating a thin film of silicon dioxide on one side of a platinum panel, (2) densifying the resultant dielectric film, (3) heating the densified dielectric film to a temperature sufficient to sinter it, and (4) applying a thin coating of a conductive metal to fabricate said miniature capacitor, the thickness of the finished dielectric layer being not greater than 1 mil.

3. In the manufacture of a miniature capacitor, the improvement comprising the steps of (1) electrophoretically depositing on one side of a molybdenum panel a boro-silicate glass, (2) densifying the dielectric film, (3) heating the densified dielectric film to a temperature sufficient to sinter it, and (4) applying a thin film of a conductive metal to fabricate said miniature capacitor, the thickness of the finished dielectric layer being not greater than 1 mil.

4. In the manufacture of a miniature capacitor, the improvement comprising the steps of (1) applying a thin film of a mixture of dielectric materials onto a metallic conducting surface by electrophoretic deposition, there being in said mixture (a) at least one material selected from the group consisting of ferroelectric titanates, niobates, zirconates and tantalates, and (b) a sufficient amount of a metal oxide to improve the parameters of loss factor and temperature coefficient, (2) densifying the deposited dielectric layer, (3) heating the densified layer to a temperature sufficient to sinter it, the thickness of the finished dielectric layer being not greater than about 1 mil and (4) cooling the sintered dielectric layer and metallic conducting surface and applying a second metallic conducting surface to said dielectric layer.

5. In the manufacture of a miniature capacitor containing at least two conducting layers each separated by a dielectric layer, the improvement comprising the steps of (1) preparing a dispersion of at least one inorganic dielectric, the particle size of said inorganic dielectric being between about 0.005 micron and about 4 microns, in a solvent which is a mixture of isopropanol and nitromethane in a ratio between about 2:1 and 8:1 volumes per volume, said dispersion further containing from about 1% to about 3% zein based on the weight of the solids, (2) applying a thin film of said dielectric material onto the surface of one of said conducting layers by electrophoretic deposition thereof from said dispersion, (3) densifying the deposited dielectric layer, (4) heating the densified layer to a temperature sufficient to sinter it, the thickness of the finished dielectric layer being not greater than about 1 mil and (5) cooling the sintered layer and said one conducting layer and applying the second of said conducting layers to said dielectric layer.

6. A process according to claim 5, wherein said dielectric material comprises a ferroelectric titanate.

7. A process according to claim 5, wherein said dielectric material comprises silicon dioxide.

8. A process according to claim 5, wherein said dielectric material comprises a boro-silicate glass.

9. A process according to claim 5, wherein said dielectric material comprises a mixture of at least two inorganic dielectrics.

10. In the manufacture of a miniature capacitor containing at least two conducting layers each separated by a dielectric layer, the improvement comprising the steps of (1) applying a dielectric layer onto the surface of one of said conducting layers by electrophoretic deposition of an inorganic dielectric comprising a member of the group consisting of barium titanate, silica and boro-silicate glass, (2) compacting the dielectric layer thereby applied by subjecting it to a hydraulic pressure between about 20 and about 50 tons/in.$^2$, (3) heating the compacted dielectric layer to a temperature between about 1175° and 1400° C. sufficient to sinter the coating, (4) applying the second of said conducting layers to said dielectric layer.

11. In the manufacture of a miniature capacitor containing at least two conducting layers each separated by a dielectric layer, the steps comprising (1) applying a layer of a boro-silicate glass to one of said conducting layers by electrophoretic deposition, (2) heating said layer to a temperature sufficient to sinter it, the thickness of the finished layer being not greater than 1 mil, (3) cooling the sintered layer and said one conducting layer and applying the second of said conducting layers to said boro-silicate glass layer.

References Cited by the Examiner

UNITED STATES PATENTS

| | | | |
|---|---|---|---|
| 2,754,230 | 7/1956 | McClean et al. | 117—212 |
| 2,759,854 | 8/1956 | Kilby | 117—217 |
| 2,793,970 | 5/1957 | Jeppson | 154—80 |
| 2,843,541 | 7/1958 | Senderoff et al. | 204—181 |
| 2,878,140 | 3/1959 | Barr | 204—181 |
| 2,887,649 | 5/1959 | Peck | 317—260 |
| 2,913,385 | 11/1959 | Satriana | 204—181 |
| 2,934,811 | 5/1960 | Wellington | 29—25.42 |
| 3,041,511 | 6/1962 | Peck et al. | 317—242 |
| 3,114,868 | 12/1963 | Feldman | 317—258 |

JOHN H. MACK, *Primary Examiner.*

JOHN F. BURNS, MURRAY TILLMAN, *Examiners.*